(12) United States Patent
Senft et al.

(10) Patent No.: US 8,243,024 B2
(45) Date of Patent: Aug. 14, 2012

(54) OPTOELECTRONIC DEVICE FOR DETERMINING RELATIVE MOVEMENTS OR RELATIVE POSITIONS OF TWO OBJECTS

(75) Inventors: Volker Senft, Seefeld (DE); Antonio Pascucci, Seefeld (DE)

(73) Assignee: Societe Civile "Galileo 2011", Monaco (MC)

( * ) Notice: Subject to any disclaimer, the term of this patent is extended or adjusted under 35 U.S.C. 154(b) by 888 days.

(21) Appl. No.: 12/294,816

(22) PCT Filed: Apr. 5, 2007

(86) PCT No.: PCT/EP2007/003149
§ 371 (c)(1),
(2), (4) Date: Sep. 26, 2008

(87) PCT Pub. No.: WO2007/115812
PCT Pub. Date: Oct. 18, 2007

(65) Prior Publication Data
US 2010/0171704 A1 Jul. 8, 2010

(30) Foreign Application Priority Data
Apr. 5, 2006 (EP) .................................... 06007195

(51) Int. Cl.
*G09G 5/00* (2006.01)

(52) U.S. Cl. ........................................ 345/170; 250/239
(58) Field of Classification Search .................. None
See application file for complete search history.

(56) References Cited

U.S. PATENT DOCUMENTS

| 6,353,217 | B1* | 3/2002 | Uchio et al. ............... 250/214 R |
| 6,550,346 | B2* | 4/2003 | Gombert et al. .......... 73/862.043 |
| 6,583,783 | B1* | 6/2003 | Dietrich et al. ............... 345/158 |
| 2003/0102422 | A1 | 6/2003 | Gombert |
| 2003/0103217 | A1* | 6/2003 | Gombert ......................... 356/614 |
| 2004/0129899 | A1* | 7/2004 | Gombert ......................... 250/548 |

* cited by examiner

Primary Examiner — Paul Huber

(57) ABSTRACT

The present invention relates to an optoelectronic device for determining relative movements or relative positions of two objects, comprising a first object fixed relative to a frame of the device; a second object mounted in spaced relation to the first object and adapted for movement relative thereto; and a plurality of measuring cells for determining movement or displacement of the second object relative to the first object. Each measuring cell comprises a light-emitting element and a detector for detecting light from the light-emitting element. The invention provides a light shield for the optoelectronic device, the light shield comprising a plurality of channels which together define a non-planar or three-dimensional array of light beam paths between the first and second objects of the optoelectronic device.

14 Claims, 11 Drawing Sheets ically is a 371 of PCT/EP2007/003149, filed
OPTOELECTRONIC DEVICE FOR DETERMINING RELATIVE MOVEMENTS OR RELATIVE POSITIONS OF TWO OBJECTS This application is a 371 of PCT/EP2007/003149, filed Apr. 5, 2007.

FIELD OF THE INVENTION

The present invention relates to an optoelectronic device for determining relative movements or relative positions of two objects. The invention also relates to a force and/or moment sensor incorporating such an optoelectronic device.

BACKGROUND OF THE INVENTION

For the computer user, it is becoming increasingly important to be able to control and implement two-dimensional and three-dimensional movements or displacements in the computer environment. This is typically achieved using a computer peripheral device. The two- or three-dimensional displacements are detected by the peripheral device and described as a translation (X, Y, Z) and/or a rotation (A, B, C) in space. Furthermore, such displacements may be used to determine a corresponding applied force and/or moment.

Recently developed computer peripheral devices of the above-described type, particularly for the office sector and the entertainment electronics sector, utilize optoelectronic devices to detect and describe displacements in two- or three-dimensional space. Here they function as an input device with which manipulations in up to six degrees-of-freedom can be input, in contrast to a joystick, a mouse or a trackball, which in general only allow input in two degrees-of-freedom. The simple, convenient input of six components, as allowed by a force and/or moment sensor comprising an optoelectronic device, is particularly desirable to control 3D design software and sophisticated computer games.

To this end, the optoelectronic device will typically include one or more measuring cell comprising a position-sensitive detector illuminated by a light-emitting element, such as a light-emitting diode (LED), for measuring displacements in multiple (i.e. up to six) degrees-of-freedom. Examples of such devices are known from United States Patent Application Publication No. 2003/102422 A1 and United States Patent Application Publication No. 2003/103217 A1.

Thus, starting from the above prior art, the present invention is based on the object of creating a more compact, more efficient and more easily assembled device design compared with known arrangements. That is, the design of the device is preferably more flexible and should require a smaller area. Also, the design of the device should be more economical to produce and should provide even more reliable operation. This design may then be implemented in the creation of an input device for use in the office or entertainment sectors or a force/moment sensor which allows uncomplicated input in up to six degrees-of-freedom.

SUMMARY OF THE INVENTION

To achieve the above object, the present invention provides a light shield for an optoelectronic device as defined in claim 1, 3 or 5, as well as an optoelectronic device incorporating such a light shield as defined in the claims. Preferred features of the invention are recited in the dependent claims. The invention also provides a force and/or moment sensor which incorporates an optoelectronic device as claimed. Preferably, the force sensor is used as a pan/zoom sensor for image processing and other similar office applications. The invention further provides a keyboard for a personal computer which incorporates an optoelectronic device as claimed.

STRUCTURE AND FURTHER DEVELOPMENT OF THE INVENTION

According to one aspect, the present invention provides a light shield for an optoelectronic device for determining relative movements or relative positions of two objects, wherein the light shield comprises a plurality of channels, each of which forms a path for a light beam between a light-emitting element and a detector of the optoelectronic device, and wherein at least two of said channels define light beam paths which converge with one another from the light-emitting elements. The plurality of light-path channels may be arranged in one or more group of at least two channels such that they define separate light paths which are adapted to converge towards a common detector.

According to another aspect, the present invention provides a light shield for an optoelectronic device for determining a position or movement of a second object relative to a first object, wherein the light shield comprises a plurality of channels, which together define a non-planar or three-dimensional array of light beam paths between the first and second objects of the optoelectronic device. The plurality of channels may be arranged such that the light paths defined by the channels extend in separate planes between the first and second objects, and preferably in planes which intersect with one another. That is, the individual light-path channels are adapted to direct or guide light in a three-dimensional manner between the first and second objects of the optoelectronic device. The light shield may be adapted to be mounted to either one of the two objects of the optoelectronic device.

According to a further aspect, the present invention provides a light shield for an optoelectronic device for determining a position or movement of a second object relative to a first object, the second object being substantially flat and mounted in substantially parallel spaced relation to the first object, wherein the light shield is adapted to be mounted between the first object and the second object and comprises a plurality of channels, each of which forms a path for guiding or directing a light beam between the first object and the second object of the optoelectronic device. The channels are configured to extend between the first and second objects, and as noted above, the light shield may be adapted to be mounted to either one of the two objects of the optoelectronic device.

In yet another aspect, the present invention provides an optoelectronic device for determining relative movements or relative positions of two objects, comprising:
a first object which is fixed relative to a frame of the device;
a second object which is mounted in spaced relation to the first object and adapted for movement relative thereto;
a plurality of measuring cells for determining movement or displacement of the second object relative to the first object, wherein each measuring cell preferably comprises a light-emitting element and a detector for detecting light from the light-emitting element; and
a light shield of the invention as described above provided between the first object and the second object, wherein each light-path channel of the light shield extends at least some distance between a light-emitting element and a detector of one of the measuring cells.

In a preferred form of the optoelectronic device, the first object and the second object each comprises a substantially flat or plate-like member, which is preferably substantially rigid. The second object may thus be mounted in the device such that it is substantially parallel to and spaced from the first object, which, in turn, is rigidly fixed to the frame of the device. Accordingly, in a neutral or non-deflected position, the second object is arranged substantially parallel to the first object. The plane of the first object may therefore be considered to form a reference plane for the device.

In a preferred form of the optoelectronic device of the invention, the second object is elastically mounted relative to the first object and is resiliently biased to a neutral position. In this respect, the optoelectronic device includes resilient mounting means which bias the second object to return to the neutral position after it has been moved or displaced. The resilient mounting means preferably includes spring means, and may include one or more coil spring or any other suitable elastic member.

In a preferred version, the optoelectronic device includes at least two measuring cells, and preferably from three to six measuring cells. The light-emitting elements are preferably light-emitting diodes (LEDs), and more preferably, infra-red light-emitting diodes (ILEDs). The detectors are preferably position-sensitive detectors (PSDs), and more preferably, position-sensitive infra-red detectors (PSIDs).

In a preferred form of the invention, the light shield is in the form of a housing having cavities or conduits forming the light path channels. That is, the light-guide channels are typically formed by wall portions of the light shield and each channel at least partially surrounds or encloses the light path to define a cavity along which the light can be directed or guided between a light-emitting element and a detector of the optoelectronic device. Thus, the channels may direct or guide light from the light-emitting elements in a three-dimensional manner between the first and second objects of the optoelectronic device. The light shield itself may be adapted to at least partially enclose or house light-emitting elements of the optoelectronic device.

In a preferred form of the invention, the arrangement of the light-path channels in the light shield is such that the light paths extend in separate planes between the first and second objects, preferably in planes which intersect with one another. The light-path channels preferably define light paths which are inclined at an angle relative to a base reference plane of the device. This reference plane may correspond to a plane of the frame of the device, or to a plane of the first and/or the second object. The light-path channels of the light shield preferably define light paths which are inclined relative to the reference plane at an angle between 0° and 90°, more preferably at an angle in the range of 0° to 60°, and even more preferably at an angle in the range of 10° to 30°.

In a preferred form of the invention, the light shield has a unitary structure. For example, the light shield may be fabricated as a unitary or integral component in a moulding operation, preferably from a polymer-plastics material. The material of the light shield is typically non-transparent, and preferably opaque, to ensure unwanted or extraneous light is excluded from the detectors of the optoelectronic device.

One of the advantages of the light shield of the invention is that it provides for both a very compact configuration of the optoelectronic device, as well as for a large degree of flexibility in the orientation of the measuring cells. In particular, the design of a light shield component defining a three-dimensional array of the measuring cells has been found to produce a very compact optoelectronic configuration, which not only ensures the exclusion of unwanted extraneous light from the position-sensitive detectors but also enables construction of a smaller and more space-efficient device.

In a preferred form of the optoelectronic device of the invention, each measuring cell further includes a slit diaphragm arranged in the light path between the position-sensitive detector and the light-emitting element. At least one of the detector, the light-emitting element and the slit diaphragm of each measuring cell is associated with the first object and is fixed relative to the frame of the device, and at least one other of the detector, the light-emitting element and the slit diaphragm of each measuring cell is associated with the second object and is movable therewith.

Thus, in a preferred form of the invention, the light shield incorporates one or more slit diaphragm. Specifically, a slit diaphragm is preferably provided in, or associated with, each of the light-path channels formed in the light shield. In particular, one or more slit diaphragms may be incorporated in the wall portions of the light shield which enclose the channels. The light-path channels defined by the light shield housing preferably extend between each light-emitting element and its associated slit diaphragm. The housing is thereby adapted to shield each of the position-sensitive detectors from extraneous or unwanted light.

In a preferred form of the invention, the light shield comprises a component having at least three side regions and along each side region at least one light-path channel is formed. More preferably, each side region of the light shield comprises two light-path channels defining light beam paths which converge with one another. Thus, in one particular version, each side of the light shield housing has two separate light path channels.

In a preferred form of the optoelectronic device, at least one position-sensitive detector is illuminated by two separate light-emitting elements to thereby form two measuring cells with a common detector. In this case, the light shield may define separate light path channels extending from the two separate light-emitting elements and converging towards the common position-sensitive detector, as noted above. Each of said two measuring cells with the common detector preferably has a separate slit diaphragm arranged in the beam path of the corresponding light-emitting element. The two slit diaphragms may be arranged adjacent one another, preferably in parallel, in a wall portion of the light shield housing. It will be appreciated, however, that the two measuring cells having the common position-sensitive detector illuminated by separate light-emitting elements may optionally also have a single, common slit diaphragm which is arranged in the beam path of both light-emitting elements.

In a preferred form of the optoelectronic device, a slit direction of at least one of the slit diaphragms is aligned substantially transverse, e.g. essentially perpendicularly, to a light-sensitive part or axis of the position-sensitive detector. A plane of the light shining through at least one of the slit diaphragms and incident upon the detector may form an acute angle with a plane of the light-sensitive part of the detector.

Preferably, each position-sensitive detector that is illuminated by more than one light-emitting element to form multiple measuring cells is illuminated alternately (i.e. periodically) by the light-emitting elements. A measurement value of the detector is then read out simultaneously with its illumination. In other words, the detector of each measuring cell is illuminated by only one light emission device at any particular time, and the measurement value of the detector is designed to be read out simultaneously therewith.

Typically, the measuring cells having a common position-sensitive detector are arranged such that the beam paths which emanate from the light emission devices intersect and illuminate substantially the same portion of the common detector; for example, in the plane of their intersection.

In a preferred form, the optoelectronic device of the invention comprises a stop arrangement for limiting the movement or displacement of the second object relative to the first object. The stop arrangement comprises a mounting part adapted to be fixed relative to a frame of the optoelectronic device, and at least one generally elongate stop member arranged laterally of and substantially rigidly connected with the mounting part.

The stop arrangement is designed to be mounted within the optoelectronic device in order to provide a physical barrier to the movement or displacement of the second object relative to the first object beyond a certain, predetermined limit. The stop arrangement is thus designed to prevent the user from inadvertently overloading the device during normal use.

In a preferred form of the stop arrangement, the mounting part is generally elongate and is adapted to be fixed relative to the frame of the optoelectronic device at one end region of thereof. For example, the mounting part may be adapted to be fixed to the frame of the optoelectronic device by a fastener, such as a threaded fastener, or by an adhesive. The at least one stop member is substantially rigidly connected with the mounting part at a location spaced from that end region of the mounting part which is, or is adapted to be, fixed to the frame. Thus, the at least one stop member may be rigidly interconnected with the mounting part at the other end region of the mounting part opposite the end region to be fixed relative to the frame.

In a preferred form of the stop arrangement, the at least one stop member is arranged laterally of the mounting part such that the stop member extends in a direction substantially parallel to a longitudinal extent of mounting part.

In a preferred form of the invention, the light shield comprises a space or cavity which receives the stop arrangement or at least one stop member of the optoelectronic device. Accordingly, the wall portions of the light shield defining that space or cavity may be adapted to contact the stop arrangement or the at least one stop member when a limit of relative movement between the first object and the second object is reached. The light path channels are preferably arranged around the space or cavity for receiving the stop arrangement or the at least one stop member.

The 3D input devices according to the invention can be equated to a force and/or moment sensor. The translatory movements (X, Y, Z) correspond to the forces ($F_x$, $F_y$, $F_z$), and the rotational movements (A, B, C) correspond to the moments ($M_x$, $M_y$, $M_z$). A pan/zoom sensor typically corresponds to a force sensor ($F_x$, $F_y$, $F_z$), since the pan/zoom sensor may capture only translatory movements (X, Y, Z).

The above description of the present invention will be more fully understood from the following detailed description of particular embodiments of the invention, which is made by way of example with reference to the accompanying drawings.

BRIEF DESCRIPTION OF DRAWINGS

Embodiments of the invention are illustrated in the following drawings figures, in which like features are indicated with like reference symbols, and in which.

DETAILED DESCRIPTION OF THE EMBODIMENTS

Referring firstly to FIGS. 1 to 4 of the drawings, various components of an optoelectronic device 100 of the present invention are illustrated. In this instance, the optoelectronic device of the invention is embodied as a force/moment sensor and is designed to function as an input device to allow uncomplicated and user-friendly motion input in up to six degrees-of-freedom in a 3D computer environment.

Figure 1:
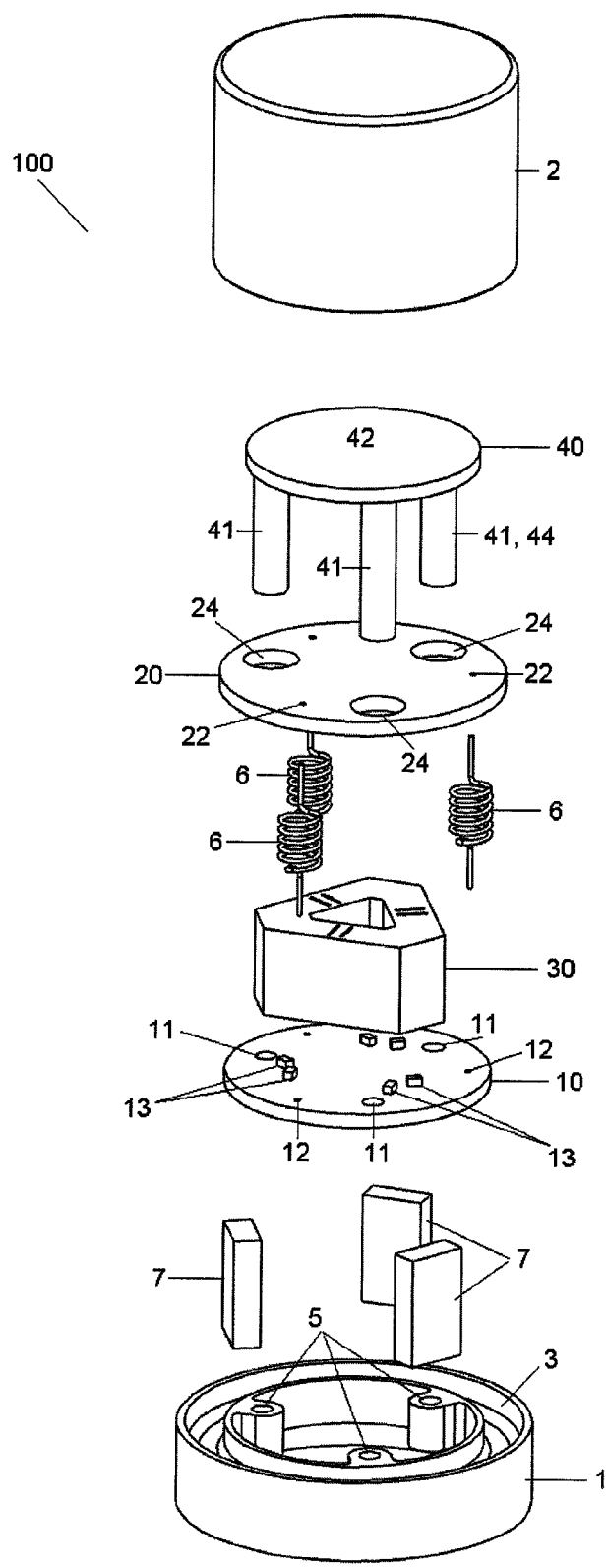
FIG. 1 shows an exploded perspective view of an optoelectronic device according to an embodiment of the present invention embodied as a force/moment sensor.
Figure 2:
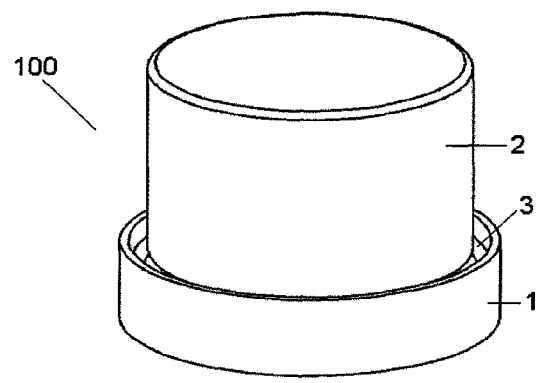
FIG. 2 is an assembled perspective view of the optoelectronic device of FIG. 1.
Figure 3:
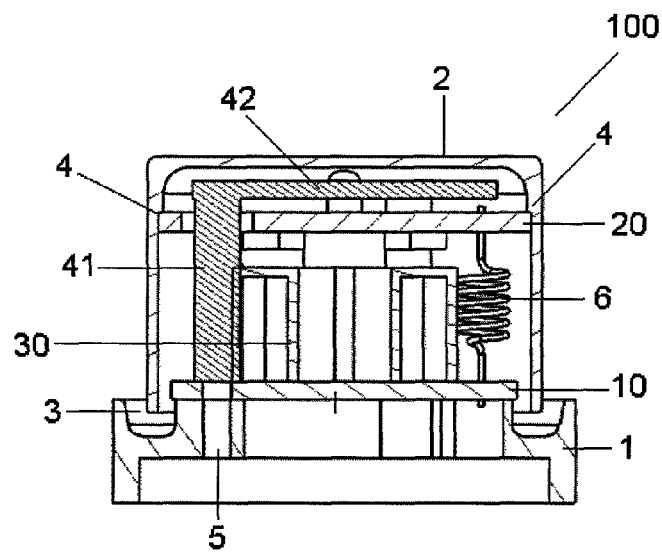
FIG. 3 is a sectioned side view of the optoelectronic device of FIG. 2

The optoelectronic device 100 includes a frame or base 1 which typically remains stationary on a desktop or bench during use, and a knob-like cap 2 which is movably mounted on the base 1 and forms the input means with which a user may input movements to be detected and interpreted by the device 100. In particular, the cap 2 of the device 100 is designed to be grasped by the user and manipulated relative to the base 1 to generate the desired input. As can be seen in FIGS. 1 to 3, the lower edge of the cap is positioned in an annular recess 3 at the periphery of the base 1 with sufficient clearance to allow a degree of movement of the cap in all directions. The device 100 is thus designed to detect and ascertain or determine the movements or displacements of the cap 2 relative to the base 1.

In order to determine the relative movements or positions of the cap and base, the optoelectronic device 100 includes a first board member 10 fixed relative to the base of the device, a second circular board member 20 resiliently mounted in spaced relation to the first board member 10 and adapted for movement or displacement relative thereto, and a plurality of optoelectronic measuring cells for determining relative movements or displacements between the first and second board members. The first and second board members 10, 20 are substantially rigid, plate-like members which preferably comprise a printed-circuit substrate and preferably also carry at least some of the electronic components of the optoelectronic measuring cells, as is known for example from US 2003/102422 and US 2003/103217 noted earlier. In the further description, the first and second board members 10, 20 will simply be referred to as the first board 10 and the second board 20, respectively.

As can be seen in FIG. 3, the knob-like cap 2 is rigidly fixed to the second board 20 at an outer periphery thereof. That is, the second board 20 is fixed, e.g. using cement or adhesive, in abutment with a shoulder 4 formed on an inner surface of the cap 2. Furthermore, the first board 10 is rigidly connected to the frame or base 1, typically by means of screws inserted through mounting holes 5 formed in the base and through corresponding screw-holes 11 formed in the first board 10. Thus, the movement or position of the cap 2 relative to the base frame 1 is determined by detecting and measuring relative movements and/or positions of the first board 10 and the second board 20. Accordingly, the two 'objects' for which the optoelectronic device 100 of the invention determines relative movements or positions may be understood as being the first board 10 and the second board 20. Nevertheless, the relative movements or positions of those two objects also correspond to the relative movements or positions of the base 1 and the cap 2 to which the first board 10 and the second board 20 are respectively rigidly connected.

Figure 4:
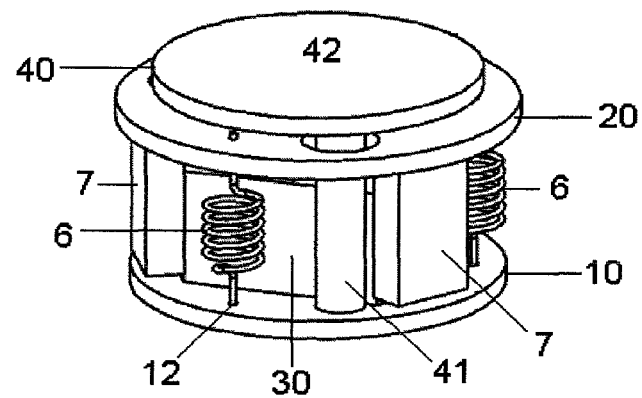
FIG. 4 shows an assembled perspective view of the core part of the optoelectronic device of FIG. 1.

With reference to FIGS. 1, 3 and 4 of the drawings, the second board 20 is elastically connected to the first board 10 by three equally spaced coil spring elements 6. A lower end of each of the spring elements 6 is adapted to be received and fixed (preferably by soldering) within a corresponding mounting hole 12 formed in the first board 10. Similarly, an upper end of each of the spring elements 6 is adapted to be received and fixed (again, preferably by soldering) within a corresponding mounting hole 22 formed in the second board 20. In this way, the substantially circular second board 20 is mounted in a neutral position (shown in FIG. 4) spaced directly above and essentially parallel to the substantially circular first board 10, such that the second board 20 is elastically biased to the neutral position by the spring elements 6. In this regard, the springs 6 act to return the second board 20 to the neutral position when it is moved or displaced relative to the first board 10.

Figure 5:
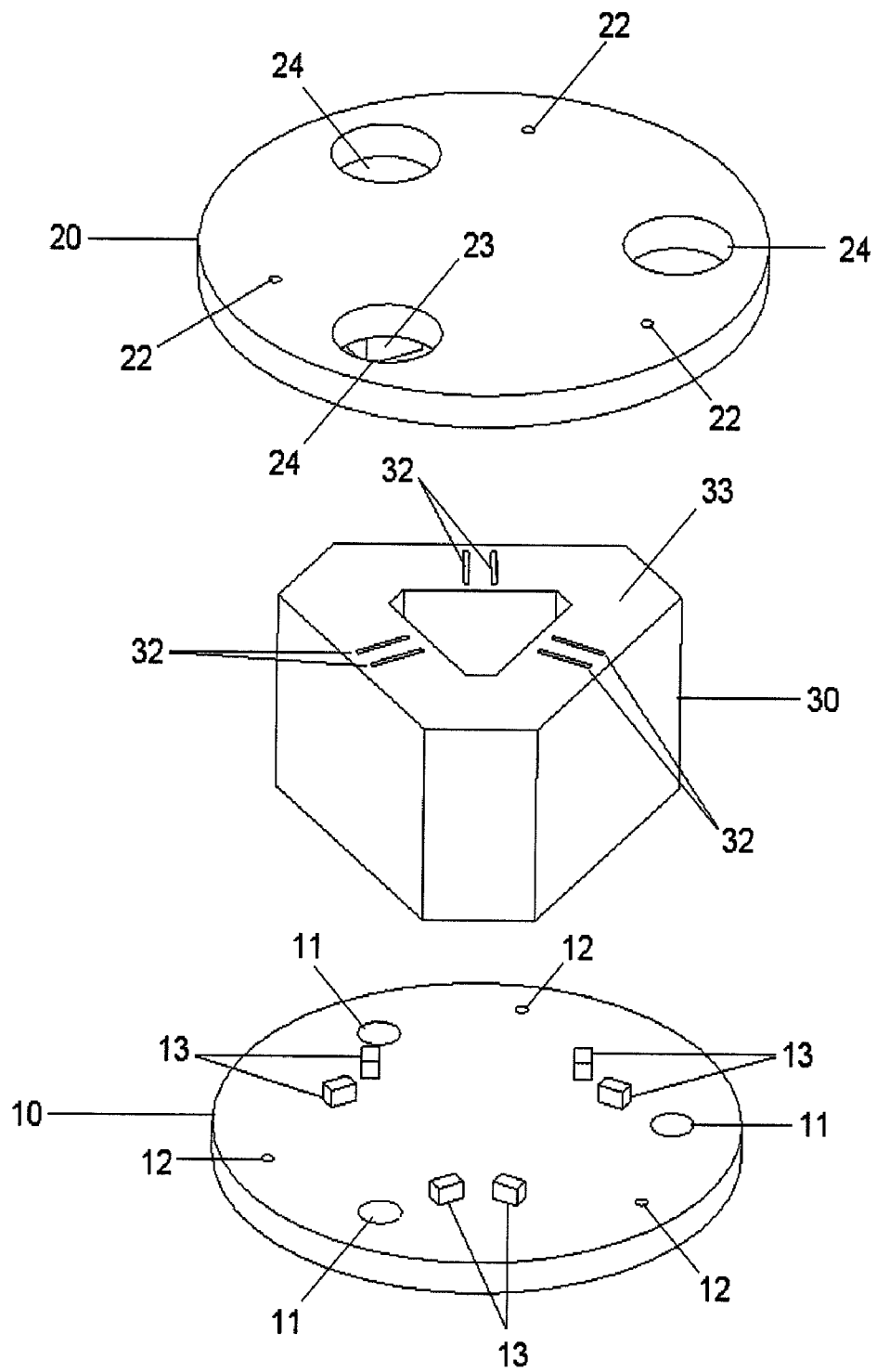
FIG. 5 shows an exploded upper perspective view of parts of the optoelectronic device of FIG. 1.
Figure 6:
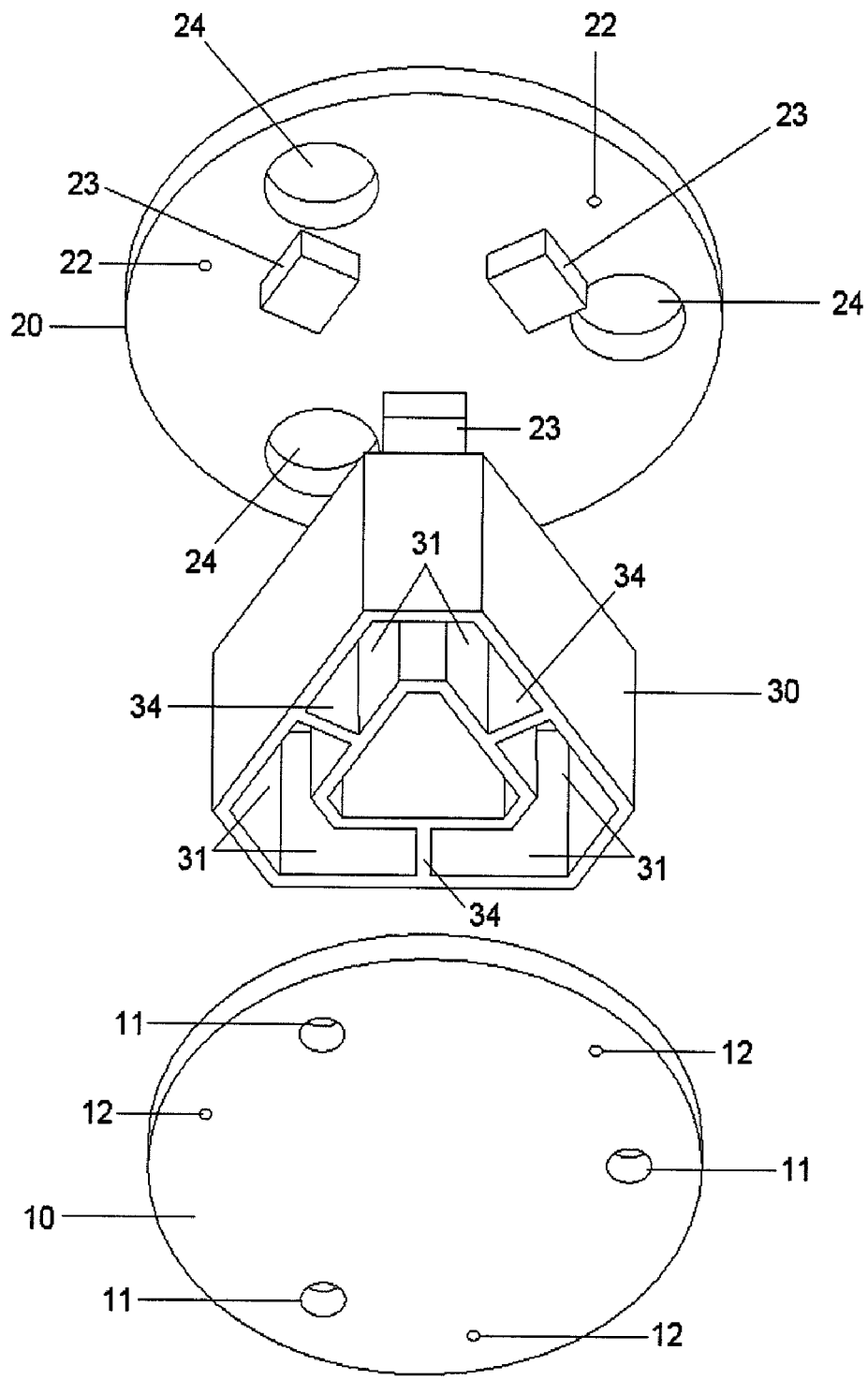
FIG. 6 shows an exploded lower perspective view of parts of the optoelectronic device of FIG. 1.
Figure 7:
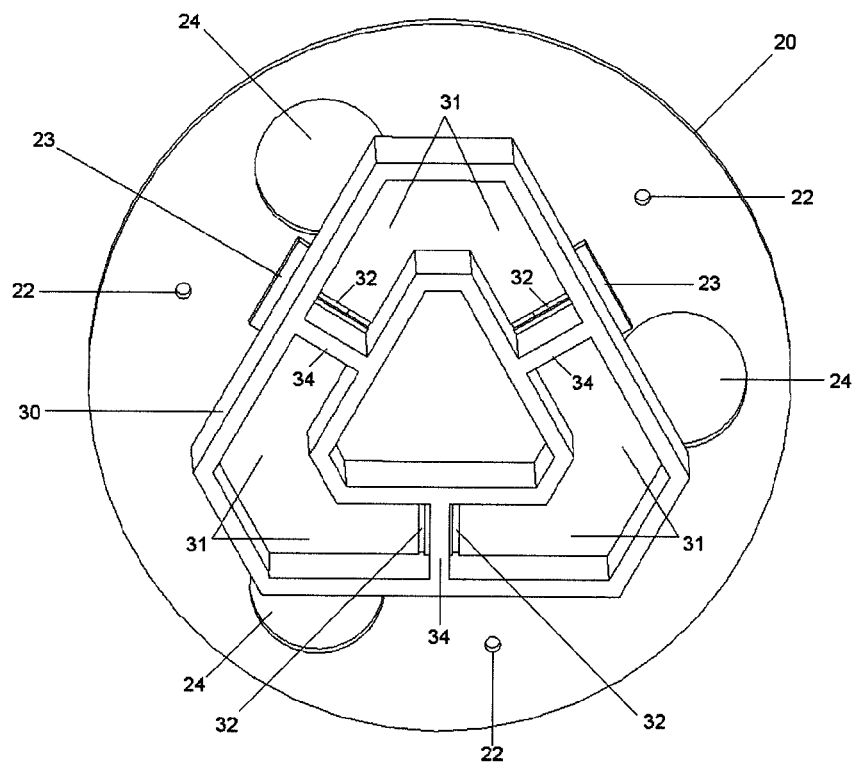
FIG. 7 shows an underside view of the light shield and second board member of the optoelectronic device of FIG. 1.

Still referring to FIG. 1, but also now to FIGS. 5, 6 and 7 of the drawings, each of the measuring cells for determining the relative movements and/or positions of the first and second boards 10, 20 comprises a light emitting element in the form of an infrared light-emitting diode (ILED) 13 projecting from on an upper side the first board 10 and a position-sensitive infrared detector (PSID) 23 mounted on an underside of the second board 20, facing the first board 10. Thus, in this embodiment, the ILEDs 13 mounted on the first board 10 are fixed relative to the base 1 of the device 100 and the PSIDs 23 mounted on the second board 20 are adapted for movement relative to the ILEDs 13 as the second board 20 is moved via the knob-like cap 2.

Furthermore, as will be particularly apparent from FIGS. 5 to 7, a light shield 30 is provided between the first board 10 and the second board 20 for effectively housing the ILEDs 13 and for shielding the PSIDs 23 from unwanted or extraneous light which might otherwise affect the accuracy of the readings the PSIDs provide. In this embodiment, the light shield 30 takes the form of a multi-sided (generally triangular) prismatic housing which is designed to be mounted stationary on the first board 10 such that it covers and substantially houses the ILEDs 13. In this particular embodiment, there are six ILEDs 13 provided on the first board 10 and three PSIDs 23 on the second board 20, such that each PSID 23 is designed to be illuminated by two separate ILEDs 13. Each PSID 23 is thereby designed to form a part of two separate measuring cells.

As can be clearly seen in FIGS. 6 and 7 of the drawings, the light shield 30 has a generally hollow structure with a number of cavities that define individual light-path channels 31 between each ILED 13 on the first board 10 and its respective PSID 23 mounted on the second board 20 above. Furthermore, as shown in FIG. 5, the light shield housing 30 includes slit diaphragms 32 formed in a top side or wall 33 thereof, such that each of the slit diaphragms 32 is arranged in the light-path between one ILED 13 and the respective PSID 23 which that ILED is intended to illuminate. In this embodiment, each of the ILEDs 13 is arranged in a vicinity of a vertex between two adjacent sides of the generally triangular housing 30 and the respective slit diaphragms 32 are centrally located along the lengths of each side at the top wall portion 33. The slit direction of each slit diaphragm 32 is substantially transverse, and preferably perpendicular, to a light-sensitive part or axis of the associated PSID 23. The wall portions 33 of the light shield 30 are non-transparent, i.e. typically opaque, to exclude unwanted or extraneous light from the PSIDs 23 and thereby ensure that only light transmitted through the slit diaphragms 32 falls upon the detectors.

With further reference to FIGS. 6 and 7 of the drawings, because each of the PSIDs 23 is illuminated by two separate ILEDs 13, each of the sides of the generally three-sided light shield housing 30 is divided into two separate light-path channels 31 by a central dividing wall 34. In this way, each PSID 23 is illuminated by its two separate ILEDs 13 via two separate slit diaphragms 32. Each of the slits 32 provides optical communication with the associated PSID for only one of the ILEDs 13. That is, each ILED 13 is provided with its own dedicated slit diaphragm 32. The slit diaphragms 32 of each pair are arranged substantially parallel and extend generally perpendicular to a light-sensitive part of the associated PSID 23. Thus, the two channels 31 formed along each side of the generally triangular housing 30 define converging light beam paths from the ILEDs 13 at the vertices towards the common PSID 23.

The channels 31 of the light shield 30 thus define a plurality of individual light beam paths between the ILEDs 13 on the first board 10 and the PSIDs 23 on the second board 20, such that each of the light beam paths is arranged to extend at an angle in the range of about 30° to about 60° (and preferably at about) 45° relative to the plane of the first board 10, i.e. relative to a base reference plane for the device 100. Furthermore, the light beam paths defined by the light-path channels 31 formed along each side of the light shield 30 extend in three separate, intersecting planes generally corresponding to the planes of the sides of the housing 30. In this regard, the light beam paths of the two measuring cells having a common PSID 23 may be considered to lie within the same plane, such that the light shield 30 forms a three-dimensional array of light beam paths between the ILEDs 13 and the PSIDs 23. This, in turn, provides for a particularly compact optoelectronic device 100, while also affording great flexibility in modifications to the shape of the light shield. In particular, it will be appreciated that other light shield configurations, including e.g. quadratic and pentagonal prisms and other multi-sided shapes, as well as curved sided shapes, are also contemplated by the present invention.

The channels 31 on adjacent sides of the light shield housing 30 join with each other to form a V-shape recess at each of the corner regions, such that the light shield 30 has three V-shaped cavities or recesses separated from each other by the intermediate dividing walls 34. The pairs of ILEDs 13 arranged in each corner of the housing have relatively focussed light beams directed at their respective slit diaphragms 32 and PSIDs 23. This, together with the design and non-transparent nature of the light shield 30 itself, assists in ensuring that only light from an associated ILED 13 illuminates the respective PSID 23.

In an alternative embodiment contemplated by the invention (but not illustrated), each pair of ILEDs 13 mounted in each corner region of the light shield 30 could be replaced by a single ILED 13 having a broader beam. In such an embodiment, each ILED 13 could then illuminate both of the light-path channels 31 extending along adjacent sides of the housing, and thereby simultaneously illuminate two separate PSIDs 23.

Figure 8:
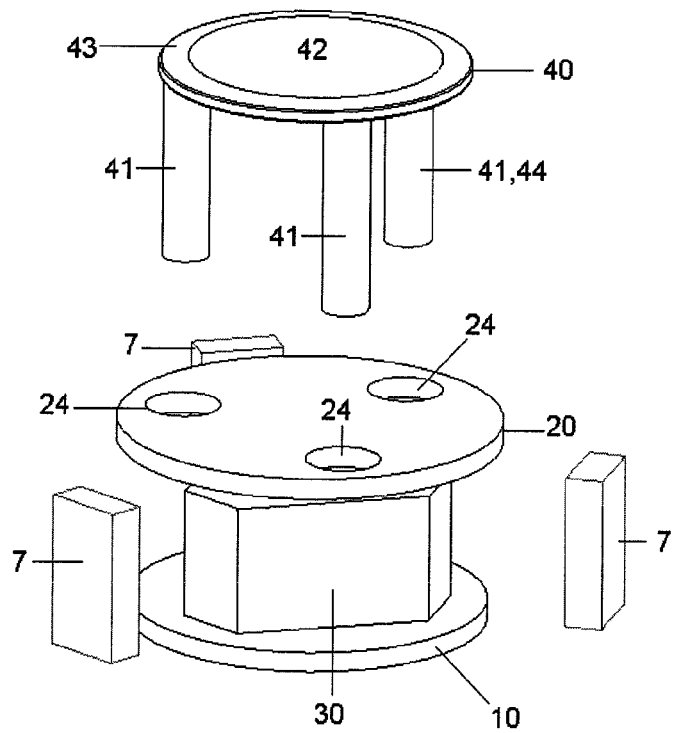
FIG. 8 shows an exploded perspective view of parts of the optoelectronic device of FIG. 1.
Figure 9:
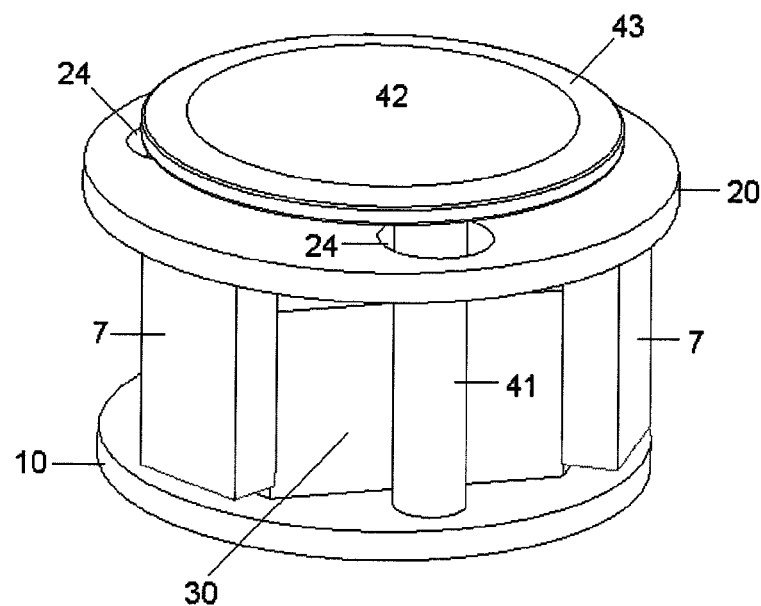
FIG. 9 shows an assembled perspective view of the parts of the optoelectronic device illustrated in FIG. 8.

Returning to FIG. 1, and also considering the schematic illustrations of FIGS. 8 and 9 (which omit illustration of the spring elements 6 and some other details), it will be seen that the optoelectronic device 100 further includes a stop arrangement 40 which is designed to provide a physical barrier to movement or displacement of the second board 20 relative to the first board 10 beyond a specific predetermined limit. The stop arrangement 40 thereby prevents any inadvertent overloading of the device 100 during use.

In this regard, the stop arrangement 40 comprises three generally elongate stop members 41 in the form of cylindrical studs or pins which are interconnected with one another at an upper end region thereof via a plate-like connecting member 42. The three pin members 41 are equally spaced apart from one another and extend substantially parallel from one side of the plate member 42. Furthermore, the pin members 41 are adapted to be received through corresponding openings or holes 24 formed through the second board 20 and to extend towards the base 1 to be rigidly secured relative thereto. As is apparent from FIG. 3, the pin members 41 are arranged to align with the mounting holes 5 in the base 1 used for rigidly securing the first board 10. Accordingly, the pin members 41 are preferably also secured relative to the base 1 using the same mounting holes 5. In this regard, the pin members 41 are preferably provided with an internally threaded bore at their end regions distal from the plate member 42. Alternatively, the distal ends of the pin members 41 could be secured to the first board 10 using an adhesive cement or other fastening means. Thus, in this particular embodiment, the pin-like stop members 41 also form a mounting part 44 for fixing the stop arrangement 40 to the frame 1 of the optoelectronic device 100.

The stop 40 has a generally robust and rigid structure for defining a solid limit to movement of the second board 20 relative to the first board 10. Although the pin members 41 and the rigid plate member 42 could conceivably be separately formed and pre-assembled as a sub-assembly of the optoelectronic device 100, the stop 40 is more preferably formed as a rigid unitary component, e.g. by injection molding using a relatively high-density polymer-plastics material.

As is apparent from FIGS. 4 and 9 of the drawings showing the core components of the optoelectronic device 100, the openings or holes 24 formed through the second board 20 have a diameter substantially larger than the diameter of the pin members 41 they receive. In the neutral position of the second board 20 relative to the first board (as illustrated in FIGS. 4 and 9), each of the pin members 41 is positioned substantially centrally in its respective hole 24 through the second board. By virtue of the resilient deformability of the three spring mounting elements 6 connecting the board members 10, 20, the second board 20 is able to move laterally and rotationally in a plane parallel to the first board 10 within the limits defined by the holes 24 and the sides of the pin members 41. As clearly shown in FIG. 10, as the second board 20 is rotated anticlockwise from its neutral position relative to the first board 10 against the bias of the spring elements 6, the edges of the holes 24 eventually engage the lateral sides of the pin members 41, which in turn act as a stop and prevent further rotation of the second board. The same effect naturally also occurs for clockwise rotations or lateral translations of the second board 20.

To complement and dampen the action of the stop 40, three elastomeric elements 7 in the form of rectangular foam blocks may be disposed between the first board 10 and the second board 20. The elastomeric blocks 7 may be attached to an underside of the second board 20 at positions closely adjacent to one of the pin members 41. In this way, as the second board 20 is displaced or moved such that an edge of the hole 24 approaches a point of contact with a lateral side of the respective pin member 41, the elastomeric block 7 is adapted to come into contact with the pin 41 and thereby dampen or cushion the contact between the second board 20 and the pin member of the stop.

Similarly, the foam blocks 7 may be mounted to extend from the second board 20 towards the first board 10, while terminating with a small gap between an end thereof and the first board. As the second board 20 is moved or displaced towards the first board 10, the elastomeric blocks 7 initially have no effect while the displacement is within the limits of the gap. Upon further displacement of the second board 20 towards the first board 10, however, the free end of at least one of the elastomeric blocks 7 comes into contact with the first board member 10 to cushion or dampen the movement of the second board 20 before it engages the stop 40. As an alternative, the foam blocks 7 may be mounted, e.g. adhered, to outer surfaces of the light shield 30 or may be mounted on the first board 10.

Figure 11:
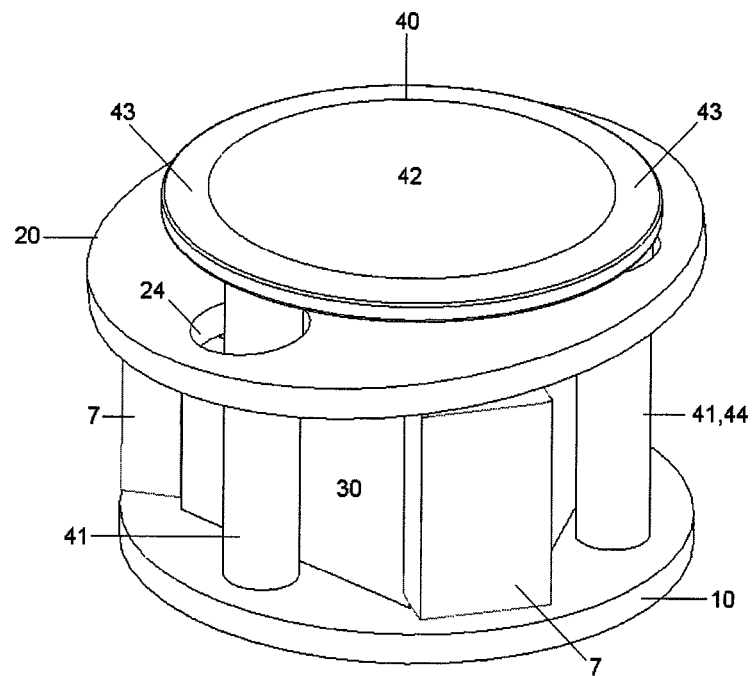
FIG. 11 shows a perspective view of the optoelectronic device in FIG. 9 when the second board member is tilted relative to the first board member.
Figure 12:
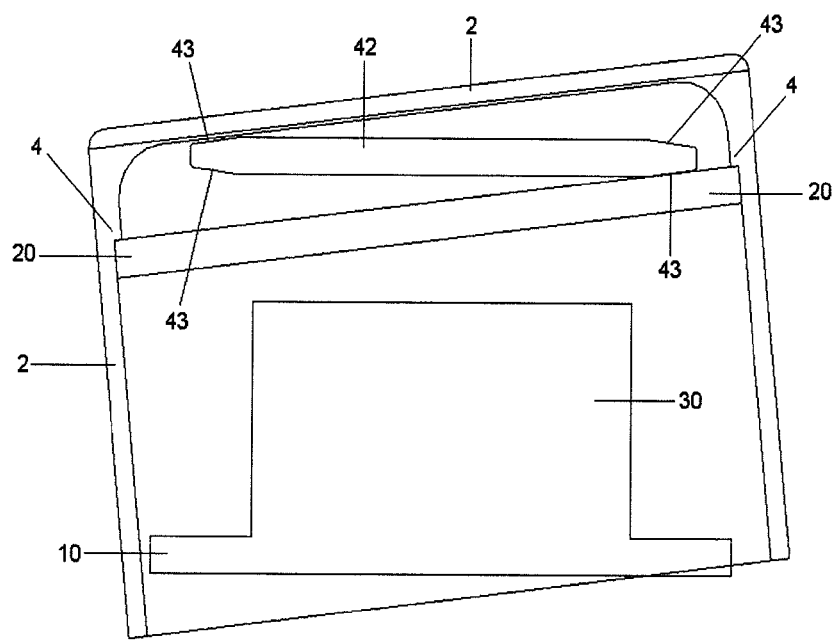
FIG. 12 shows a schematic side view of the optoelectronic device in FIG. 9 when the second board member is tilted relative to the first board member.

As illustrated in FIGS. 9, 11 and 12 of the drawings, the plate member 42 connecting the upper ends of the pin members 41 of the stop arrangement 40 comprises an annular peripheral region 43 where the surface is pitched at a specific predetermined angle relative to the neutral orientation angle of the second board 20 to thereby define a maximum angle of tilt of the second board 20 (and the cap 2) relative to the first board 10 (and the base frame 1) of the device. Such an angled annular peripheral region 43 may be provided on both an upper side and an underside of the plate member 42, as is apparent from FIG. 12.

With particular reference to FIGS. 11 and 12, when a tilting (i.e. rotational) movement is applied to the second board 20 (via the cap 2) as shown, the second board 20 will deflect until, after a predetermined amount of tilting has occurred, the second board 20 engages the plate member 42 in the angled peripheral region 43. The contact or engagement with the angled peripheral surface region 43 of the fixed plate member 42 acts to stop further relative movement of the second board 20 in that direction. Simultaneously, or perhaps even alternatively, an upper inside surface of the cap 2 may engage a corresponding angled peripheral portion 43 of the plate member 42 as indicated in FIG. 12. As is clearly shown in drawing FIG. 12, the first board 10, the light shield 30 and the stop 40 all remain stationary relative to the frame of the device 100, while the cap 2 and the second board 20 are moved relative thereto during operation of the device.

Figure 13:
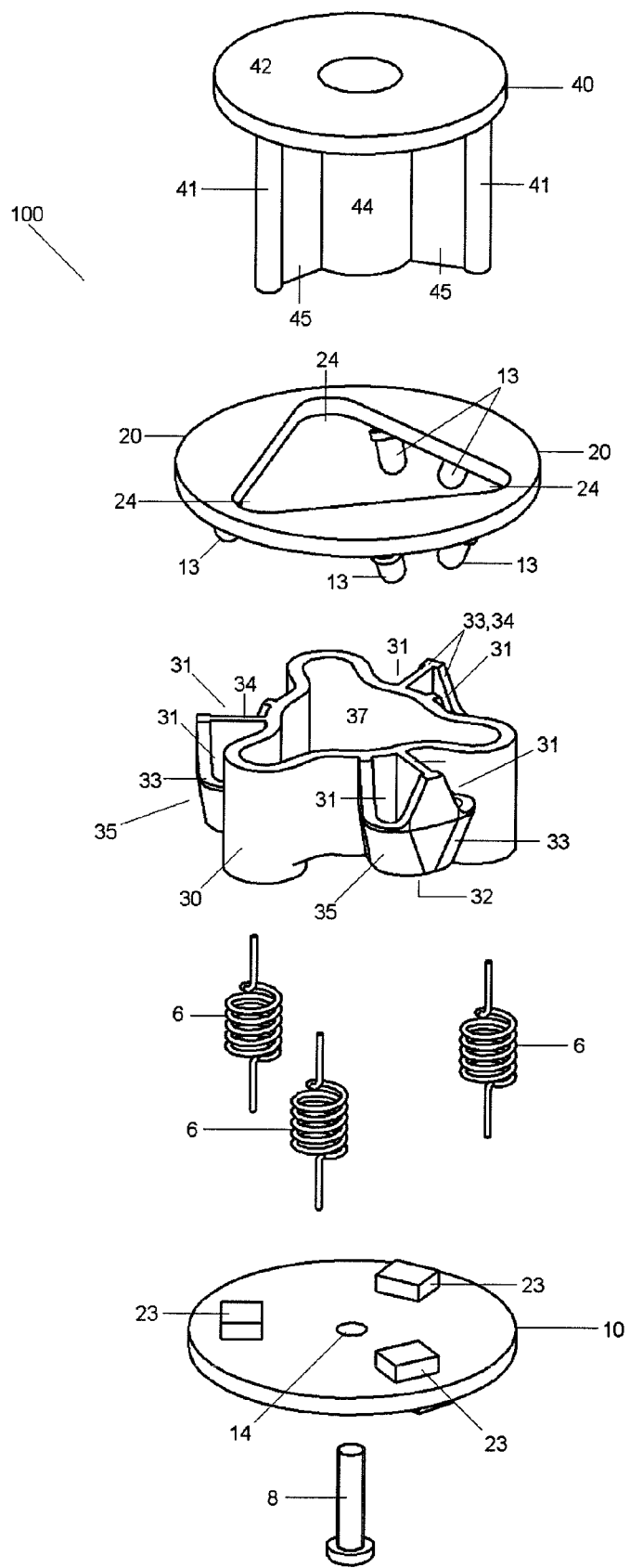
FIG. 13 shows an exploded perspective view of an optoelectronic device according to another embodiment of the present invention.
Figure 14:
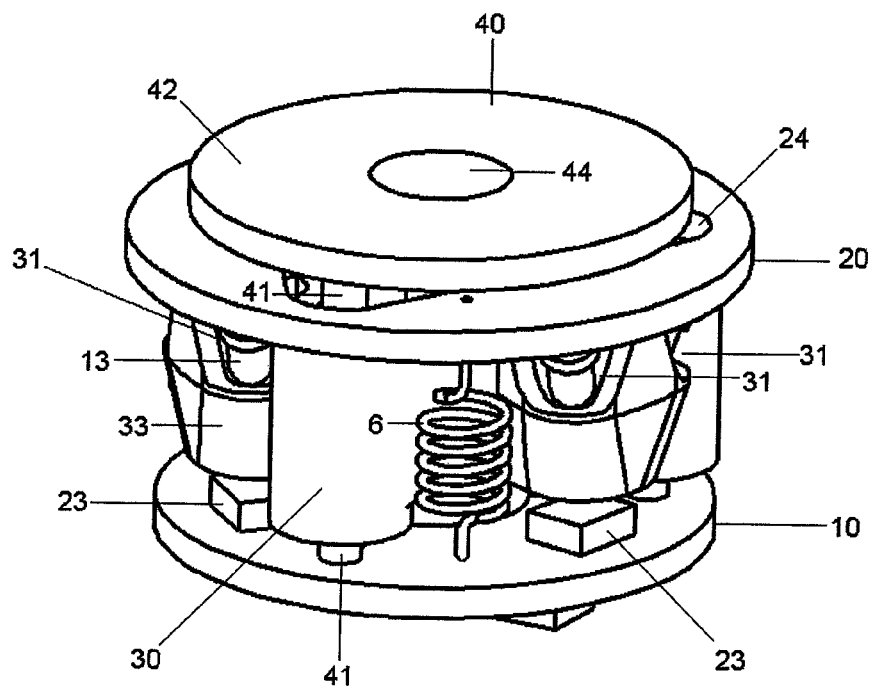
FIG. 14 is an assembled perspective view of the optoelectronic device in FIG. 13.

An alternative embodiment of an optoelectronic device according to the invention is schematically illustrated in FIGS. 13 and 14 of the drawings. An exploded view of the principle or core elements of this alternative embodiment of the device 100 is shown in FIG. 13. This view generally corresponds to the exploded view shown in FIG. 1, but with the base 1 and the cap 2 of the device omitted in this case. Like features of the optoelectronic device 100 corresponding to those features already described with reference to FIGS. 1 to 12 are labeled with the same reference numerals.

As will be seen, the embodiment of the optoelectronic device 100 in FIGS. 13 and 14 of the drawings incorporates the same principles of the invention which are present in the previous embodiment, but in a somewhat different manner. Again, the optoelectronic device 100 includes a first board 10 which is fixed to the base (not shown) and a second circular board 20 which is resiliently mounted on helical spring elements 6 in spaced and substantially parallel relation to the first board 10. The helical spring elements 6 are fixed to the first and second boards 10, 20 in the same manner as was described for the first embodiment, rendering the second board 20 resiliently movable relative to the first board 10 about a neutral position. Again, also, the optoelectronic device has a plurality of measuring cells, each of which comprises an ILED 13 and a PSID 23. In contrast to the first embodiment, however, in this embodiment the ILEDs 13 are mounted on the second board 20 for movement relative to the first board 10, while the PSIDs 23 are mounted on the first board 10 facing the ILEDs 13 and are fixed relative to the frame of the device.

As before, the optoelectronic device 100 of this embodiment has six measuring cells arranged in three groups, such that pairs of the ILEDs 13 are directed to illuminate a common PSID 23. The light shield 30 in this embodiment has quite a different configuration to the generally prismatic shape in the first embodiment, but certain characteristic features remain unchanged. The light shield 30 still has a roughly triangular configuration and includes two individual light-path channels 31 formed at each of the three side regions of that triangular configuration. In this case, however, rather than being defined by the parallel walls of a prismatic housing, the light-path channels 31 are formed in separate or discrete compartments 35 attached at the sides of the integral light shield component 30. Each of the compartments 35 has a pod-like structure, the wall portions 33 of which surround and enclose two individual channels 31 which are separated from each other by a central by dividing wall portion 34. Thus, each compartment 35 defines a pair of cavities forming light-path channels 31 which extend downwardly from the second board 20 towards the first board 10 for directing or guiding light from the respective ILEDs 13 to a PSID 23. As can perhaps be more clearly seen in FIG. 14, each channel 31 receives and partially houses one of the ILEDs 13. Note that, because the ILEDs 13 have relatively focused light beams, a full enclosure or full housing of each ILED 13 within the light shield 30 is not necessary. As was the case in the first embodiment, the light paths defined by the pair of channels 31 for the ILEDs 13 which illuminate a common PSID 23 (i.e. the channels 31 in each of the pod-like compartments 35 in this case) converge towards one another in the direction from the ILEDs 13 towards the associated PSID 23. Furthermore, as was also the case with the first embodiment, the light beam paths defined by the channels 31 at each side of the light shield 30 extend in separate, intersecting planes such that the light shield 30 forms a three-dimensional array of light beam paths between the ILEDs 13 and the PSIDs 23.

Figure 15:
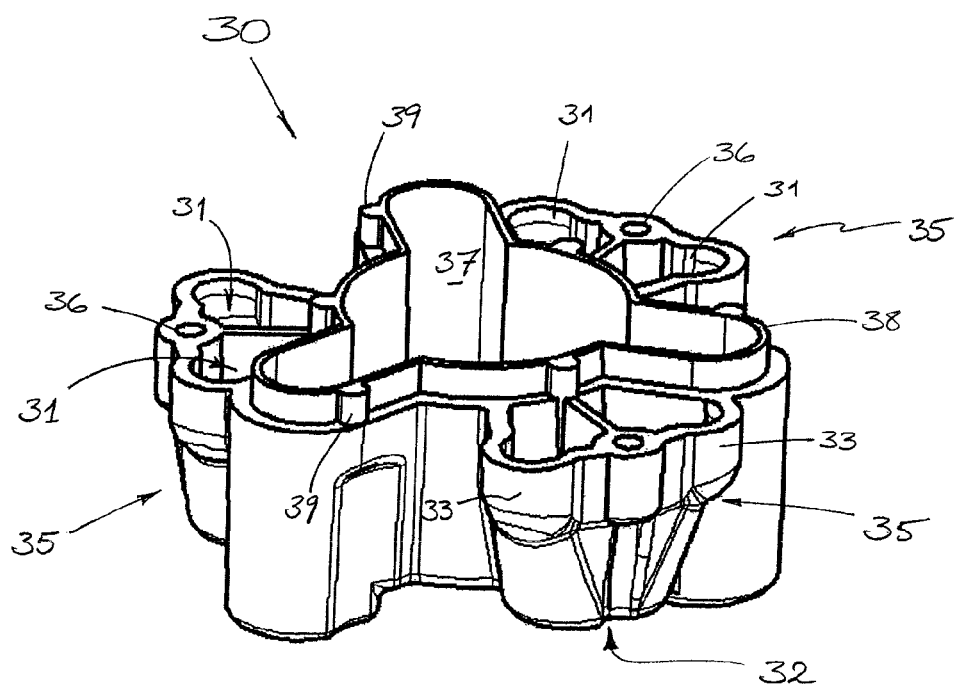
FIG. 15 is a perspective view of a light shield similar to that shown in FIG. 13.

The light shield 30 of this second embodiment can be seen in more detail in FIG. 15, albeit with some minor modifications compared with the schematic version shown in FIG. 13. For example, in the light shield 30 shown in FIG. 15, the upper part of the side wall portions 33 of each pod-like compartment 35 forming the light-path channels 31 are not cut away, such that each of the ILEDs 13 in this light shield 30 will be substantially fully enclosed and housed within a respective channel of the light shield when the device 100 is assembled. Although not actually visible in the views of the light shield shown in FIGS. 13 to 15, the wall portions of the light shield 30 on an underside of each of the pod-like compartments 35 incorporates slit diaphragms 32 above each of the PSIDs 23 in the same way as slit diaphragms were incorporated into the light shield housing in the first embodiment.

Unlike in first embodiment, the light shield component 30 in this embodiment is designed to be securely fixed to, and thus suspended from, the movable second board 20 for movement therewith relative to the first board member 10. To this end, FIG. 15 shows screw holes 36 formed adjacent the dividing wall portion 34 between each of the channels 31 in the pod-like compartments 35 for screw-fastening the light shield 30 to the second board 20. Thus, the PSIDs 23 of the optoelectronic device 100 fixed on the first board member 10 detect movements and positions of the second board 20 by detecting light transmitted from the movable ILEDs 13 and illuminating the PSIDs 23 via the slit diaphragms 32 formed in the underside of the pod-like structures 35.

With reference to FIGS. 13 and 15, it will be noted that the light shield 30 of this second embodiment constitutes a multi-function component of the optoelectronic device 100. That is, its function is not merely to direct or guide light to the PSIDs 23 in such a way that they are shielded from extraneous or unwanted light. As noted above, the light shield component 30 also has a mounting capacity for connection to the second board 20 via screw holes 36. In addition, the light shield component 30 incorporates a central space or cavity 37 which is designed to receive the stop arrangement 40, and in particular, the elongate stop members 41. In this regard, it will be appreciated by persons skilled in the art that the light shield 30 could incorporate three cylindrical spaces or cavities for a stop arrangement 40 having the same configuration as in the first embodiment. In the present embodiment, however, the stop arrangement 40 has a somewhat different configuration (as described in more detail below) and as a result, the space or cavity 37 is continuous. Similarly, the previous circular openings 24 formed in the second board 20 for accommodating the pin members 41 of the stop arrangement 40 have been interconnected in this embodiment to form a single continuous opening 25 with portions of the circular openings 24 still in the corners. Furthermore, an edge region of the light shield component 30 may be shaped to match the opening 25 formed in the board 20 to facilitate positioning and mounting of the light shield. In this regard, as can be seen in FIG. 15, an upper edge region of the light shield component 30 has an upstanding rim 38, the outer profile of which is designed to match the shape of the opening 25 formed in the second board 20. Thus, the rim 38 can be fittingly received within the opening 38 when the light shield component 30 is attached to the second board 20. It will be seen that the space or cavity 37 in the light shield component 30 includes a central region for receiving a mounting part of the stop arrangement 40 and lobes extending therefrom for receiving the respective stop members 41, as noted below.

With reference now to the stop arrangement 40 in this embodiment of the device 100 shown in FIG. 13, the stop 40 comprises a central mounting part 44 in the form of an elongate cylindrical member which is designed to be fixed relative to a frame of the optoelectronic device at a lower end thereof. For this purpose, a large screw fastener 8 is provided which passes through the central screw hole 14 formed in the first board 10 and which engages a correspondingly threaded bore (not shown) in the central mounting part 44. The same screw fastener 8 may also rigidly secure the first board 10 to the base or frame of the optoelectronic device 100. (See FIG. 1).

In addition, the stop arrangement 40 comprises three elongate stop members 41 in the form of generally cylindrical pin- or stud-members, as was the case in the first embodiment. These stop members 41 are arranged laterally of and spaced around the central mounting part 44. Furthermore, the stop members 41 extend substantially parallel to the mounting part 44 and to one another. As was also the case in the first embodiment, the stop arrangement 40 incorporates a disc-shaped plate member 42 which rigidly interconnects an upper end of each of the stop members 41 with one another. Importantly, this plate member 42 also rigidly connects each of the stop members 41 with an upper end region of the cylindrical mounting member 44—that is, the end region of the mounting part 44 which is opposite the lower end region that is fixed to the frame of the device with the screw fastener 8. In this embodiment, a connection between the stop members 41 and the mounting part 44 is also effected by web elements 45 which extend radially outward from the central mounting part 44 towards the stop members. Such radial webs, fins or rib elements enhance the rigidity of the stop arrangement 40 and in particular serve to stabilize the elongate stop members 41. The thickness of the web elements 45 can be selected according to the degree of rigidity required. The web elements 45 are shown to extend over substantially the entire length of the stop members 41, but this too may be altered according to the degree of rigidity required.

Still referring to FIGS. 13 and 14 of the drawings, it will be seen that in this embodiment the elongate stop members 41 have substantially the same length as the central mounting member 44, such that the lower ends of the stop members 41 extend to the first board 10. Unlike the first embodiment, however, these lower end regions of the stop members 41 are not fixed to the first board 10. Rather, the lower end regions of the stop members 41 merely contact and bear against the upper surface of the first board. In this way, the stop 40 of this embodiment is able to be mounted and secured to the frame by a single fastening operation via the screw fastener 8 secured to the mounting part 44.

It will be understood by persons skilled in the art that it is not necessary that the stop members 41 be particularly long nor that they extend from the plate member 42 to the first board 10. In this regard, because the central mounting part 44 is responsible for rigidly fixing the stop arrangement 40 to the frame of the device 100 at its lower end region, the stop members 41 do not need to contact the first board at all (although such a configuration may provide enhanced stability). Indeed, with reference to FIG. 14, it will be appreciated that the stop members 41 need only extend an amount sufficient to interact with the second board member 20 and/or with the upper rim 38 or an upper wall portion of the light shield component 30 forming the cavity 37 which receives the stop members 41.

Figure 16:
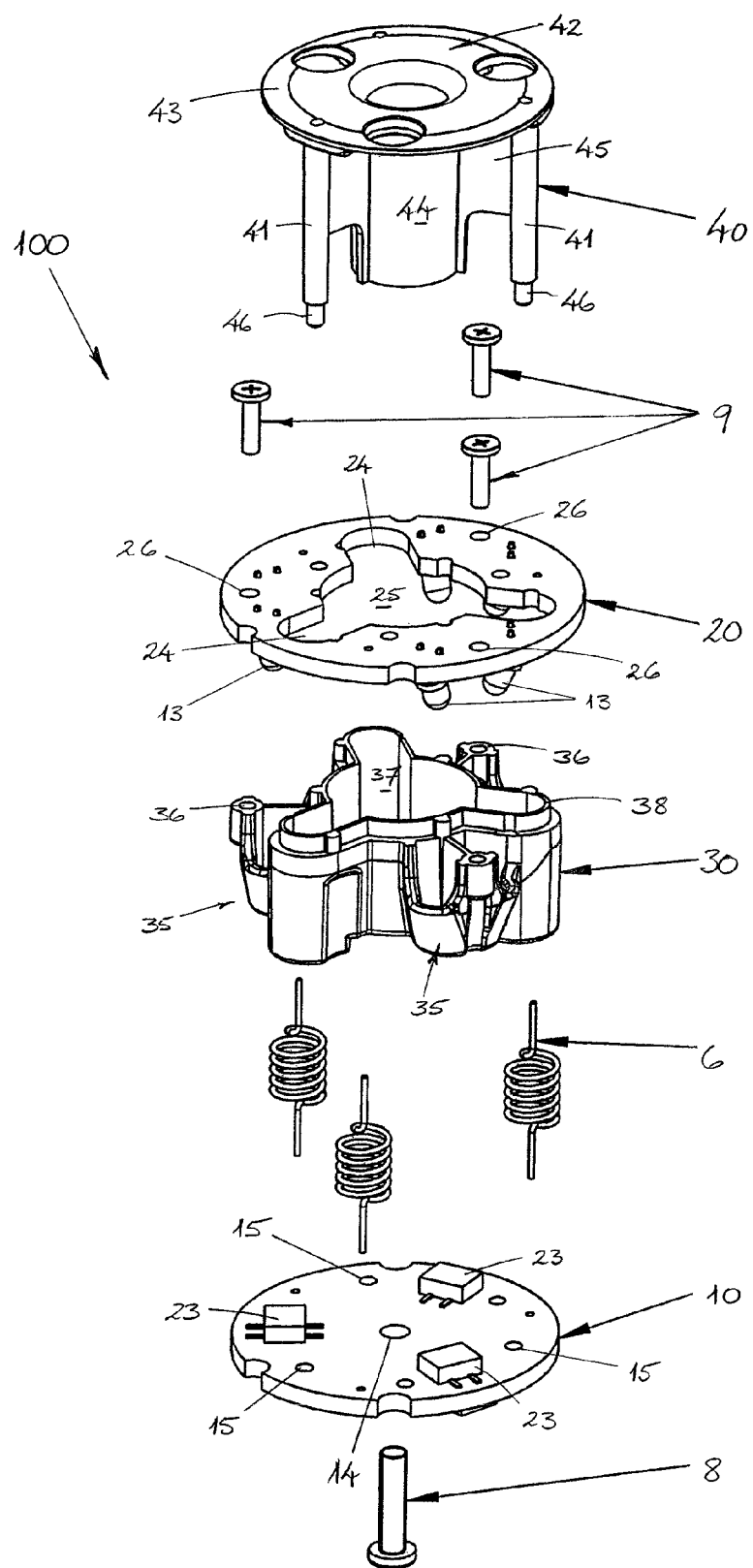
FIG. 16 shows an exploded perspective view of an optoelectronic device according to a further embodiment of the present invention.
Figure 17:
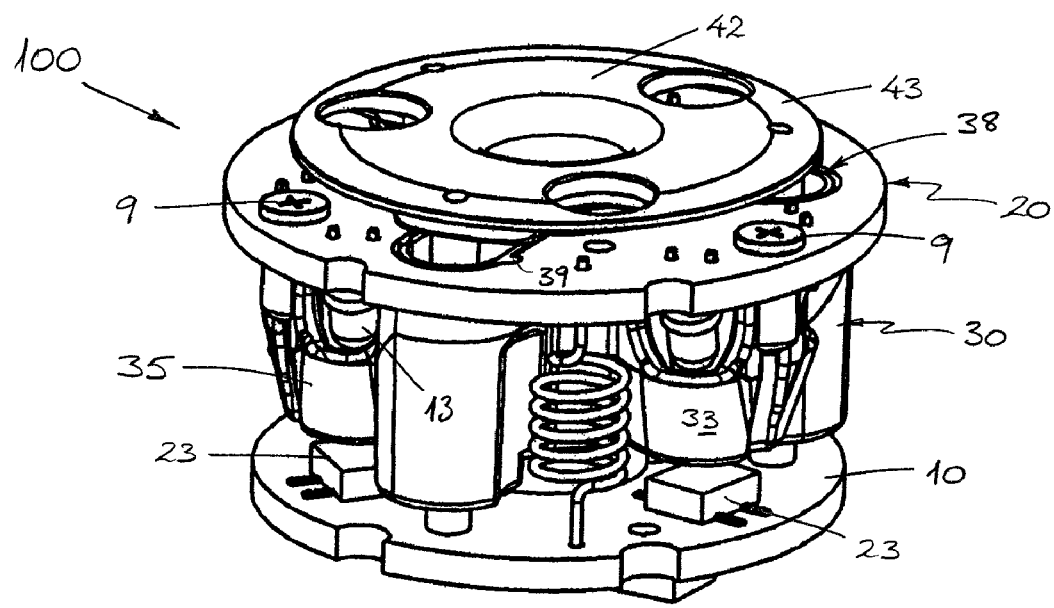
FIG. 17 is an assembled perspective view of the optoelectronic device of FIG. 16.

With reference now to FIGS. 16 and 17 of the drawings, a more detailed illustration of an embodiment of the optoelectronic device of the invention corresponding to the schematic illustrations in FIGS. 13 and 14 is provided. These drawings show more detail, but like features are labeled with corresponding reference numerals. It will be noted, for example, that the plate connecting member 42 of the stop arrangement 40 has an angled peripheral region 43 having the same design and function as that described with reference to FIGS. 8 to 12.

Figure 10:
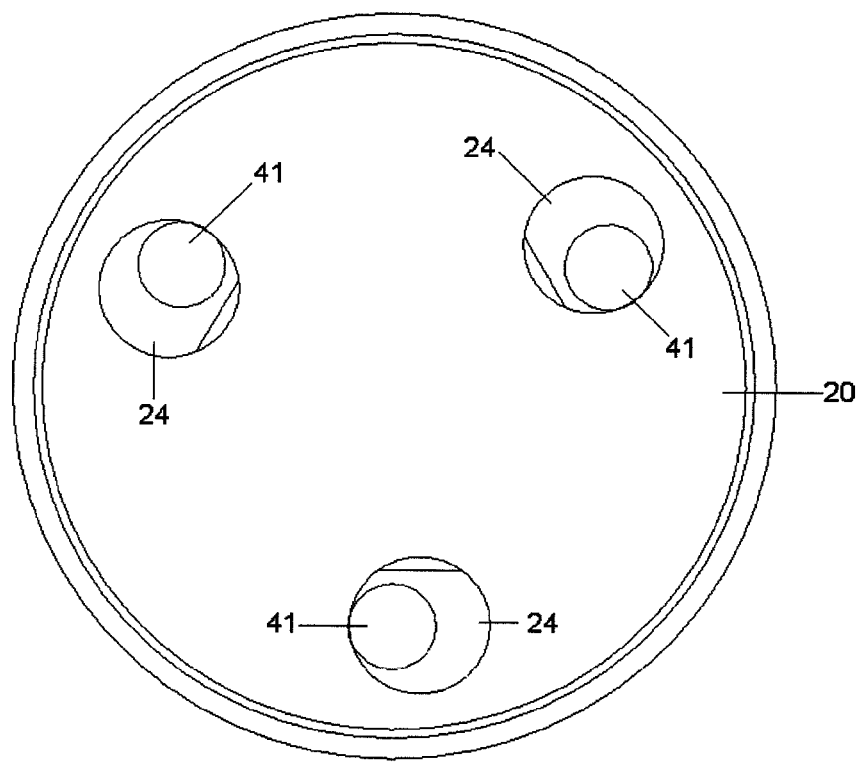
FIG. 10 shows a plan view of parts of the optoelectronic device in FIG. 9 when the second board member is rotated relative to the first board member.

Furthermore, it will be noted that the lower end of each stop member 41 includes a small projection 46 which is designed to be received and located in a respective hole 15 formed in the first board member 10. In this case, the lower ends of the stop members 41 having the projection 46 are not fixed to the first board member 10, but are merely inserted into the holes 15 to properly position or register the stop member 40. The interaction between the projections 46 and the holes 15 also provides the stop members 41 with enhanced stability when a lateral rotation of the second board 20 (i.e. via the cap 2)—e.g. as illustrated in FIG. 10—brings the board into contact with the stop members 41.

A further detail of the embodiment shown in FIGS. 16 and 17 relates to a functional aspect of the light shield component 30 not previously described with reference to FIGS. 13 and 14. This further functional aspect relates to the provision of small nodules or rounded projections (not shown) on an underside of the light shield component 30 at locations between the three PSIDs 23 mounted on the first board 10. These nodules or rounded projections are designed to act as stop elements to prevent the light shield component 30 from inadvertently coming into contact with the PSIDs 23 in the event that the second board 20 is pressed downwardly against the bias of the helical spring elements 6 before the cap 2 is attached to the optoelectronic device 100. In this regard, it will be noted from FIG. 12 that the plate-like connecting member 42 typically interacts with the cap 2 to limit the range of downward movement of the second board. However, in the absence of any cap 2, the nodules or rounded projections (not shown) on the underside of the light shield component 30 provide a clearance above the level of the PSIDs 23 to ensure that the sensitive PSID components 23 cannot be damaged by an inadvertent depression of the second board 20 prior to attachment of the cap 2.

The PSIDs 23 are typically mounted and electrically connected by wire elements soldered to the first board 10, while each of the ILEDs 13 is typically correspondingly mounted and electrically connected by wire elements soldered to the movable second board 20. The light shield component 30 is rigidly secured to the second board 20 by fastening screws 9 which pass through holes 26 in the second and engage into the holes 36 after the upper rim has been mated or fittingly received in the matching opening 25 provided in the second board 20. As also shown in FIG. 15, the provision of lugs or projections 39 (e.g. on the rim 38) and corresponding recesses or indentation in the opening 25 in board 20 further assists to properly locate the light shield component 30 relative to the board 20 and ensure that the respective orientation of the parts is correct.

The invention claimed is:

1. A light shield for an optoelectronic device which determines relative movements or relative positions of two objects, the light shield comprising a plurality of channels, each of which forms a path for a light beam between a light-emitting element and a detector of the optoelectronic device, characterized in that the light shield has a generally hollow structure with a number of cavities that form individual light path channels between each light-emitting element and its respective detector, and in that at least two of said channels define light paths which converge with one another from the light-emitting elements to the respective detector.

2. A light shield according to claim 1, wherein the plurality of light-path channels are arranged in one or more group of at least two and define separate light paths which converge towards a common detector.

3. A light shield according to claim 1, wherein the plurality of channels together define a non-planar or three-dimensional array of light beam paths between the first and second objects of the optoelectronic device.

4. A light shield according to claim 3, wherein the plurality of channels are arranged such that the light paths defined by the channels extend in separate planes between the first and second objects, and planes which intersect with one another.

5. A light shield according to claim 1, wherein the channels are formed by wall portions of the light shield and wherein each channel at least partially surrounds or encloses the light path to define a cavity along which the light is directed or guided between a light-emitting element and a detector of the optoelectronic device.

6. A light shield according to claim 5, wherein the light shield is adapted to at least partially enclose or house light-emitting elements of the optoelectronic device.

7. A light shield according to claim 5, further comprising one or more slit diaphragm in the wall portions enclosing the channels.

8. A light shield according to claim 1, wherein the light-path channels define light paths that are inclined at an angle relative to a reference plane corresponding to a plane of the frame of the device, and/or to a plane of the first object.

9. A light shield according to claim 8, wherein the light-path channels define light beam paths which are inclined at an angle between 0° and 90° relative to the reference plane, at an angle in the range of 0° to 60°.

10. A light shield according to claim 1, wherein the light shield is formed as a unitary or integral component.

11. A light shield according to claim 1, further comprising a space or cavity adapted to receive a stop arrangement or at least one stop member of the optoelectronic device.

12. A light shield according to claim 11, wherein wall portions of the light shield defining the space or cavity are adapted to contact the stop arrangement or the at least one stop member at a limit of relative movement between the first object and the second object.

13. A light shield according to claim 11, wherein the light path channels are arranged around the space or cavity for receiving the stop arrangement or the at least one stop member.

14. A light shield according to claim 1, wherein the light shield is adapted to be mounted to one of the first object and the second object.

* * * * *